July 20, 1954  E. KOHRING  2,683,918

AUTOMATIC MULTIPLE SPINDLE MACHINE

Filed Jan. 24, 1952

INVENTOR.
Erwin Kohring
BY *Richard [?]*

*Agt*

Patented July 20, 1954

2,683,918

UNITED STATES PATENT OFFICE 2,683,918

AUTOMATIC MULTIPLE SPINDLE MACHINE

Erwin Kohring, Koln-Deutz, Germany, assignor to Alfred H. Schütte, Koln-Deutz, Germany, a company of Germany Application January 24, 1952, Serial No. 268,080

Claims priority, application Germany February 9, 1951

4 Claims. (Cl. 29—37)

This invention relates to an automatic multiple spindle machine, and more particularly to such a machine equipped with automatic work feed.

The primary object of my invention is to generally improve machines of the type referred to.

Automatic multiple spindle metal-working machines of known constructions are usually provided with a drum formed with a feeding and a clamping cam, whereby the cam drum is designed to effect in a spindle position the feed of the bar-shaped work and the clamping of the work thereafter. The spindle moves successively through the various spindle positions, and the finished work is thrown off in the last position, whereupon in the next spindle position the cycle again starts with the forward feed of the work. With such a feeding device, complicated shapes can be obtained, especially since more than one tool can be made to act on the work in the individual spindle positions. It has also been proposed to produce simpler shapes with such an automatic multiple spindle machine, for example, by feeding a double length of the work in the first spindle position. Then, in the first half of the cycle of spindle positions, the first length is completed and taken off, and in the following spindle positions the same work is performed on the second length which protrudes into the working space.

One object of my invention is to provide an automatic multiple spindle machine which is adaptable to a greater variety of tasks than the prior constructions.

Another object of the invention is to provide an automatic machine which is suitable for work of greater length than could be accommodated so far, including work that exceeds in length the normal feed advance of the machine.

To the accomplishment of the foregoing and other more detailed objects which will hereinafter appear, my invention consists in an automatic multiple spindle machine, the elements of this machine, and the relation of the elements one to the other, as hereinafter are more particularly described in the specification and sought to be defined in the claims. The specification is accompanied by a drawing in which:

Figure 1:
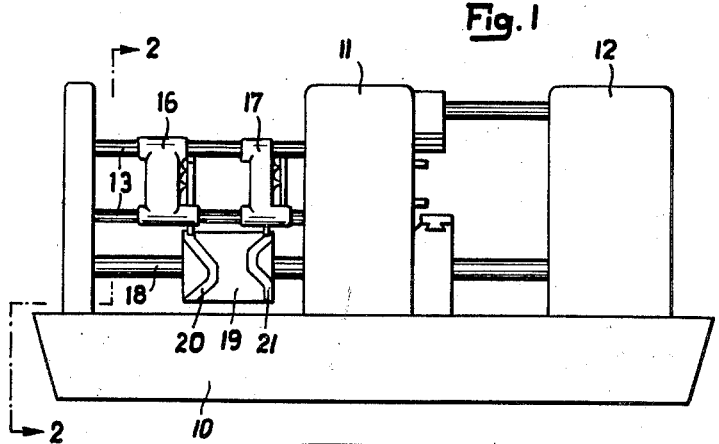
Fig. 1 is a side elevation of an automatic four spindle machine embodying features of my invention.

Referring to the drawing in greater detail, the spindle head 11 and the drive box 12 extend upwardly from the chip pan 10. Any work is worked upon in the space between the spindle head and the drive box.

Figure 2:
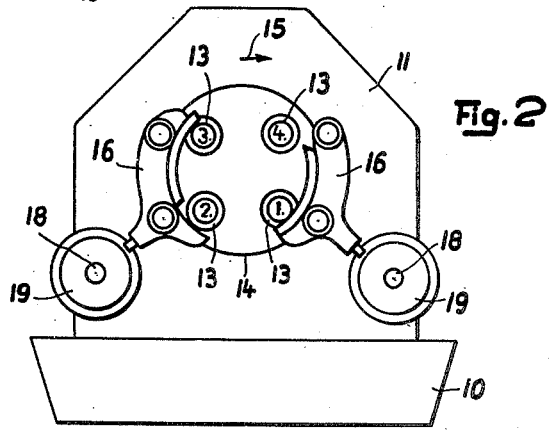
Fig. 2 is a section taken in elevation approximately in the plane of the line 2—2 of Fig. 1.
Figure 3:
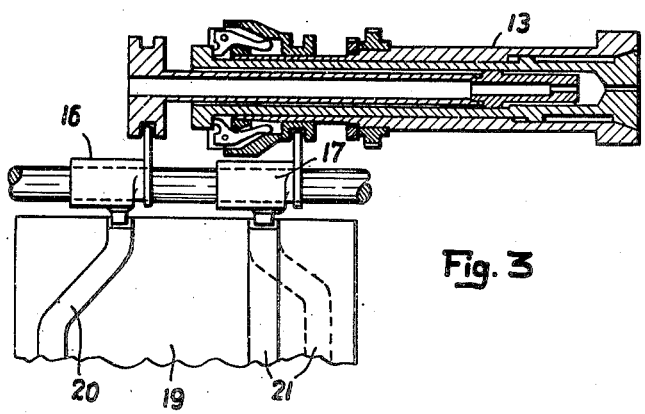
Fig. 3 shows a spindle in section and in what manner by the alternating operation of the feeding and the clamping slide the work is fed and clamped.

There are four spindles 13 supported in the spindle head. These spindles are arranged in a rotating cylinder 14. Upon completion of the operations in any one position, the cylinder is turned in the direction indicated by the arrow 15 in Fig. 2.

In the first and third spindle positions, the work is fed in the usual way by two feeding slides 16 and two clamping slides 17. These slides are actuated by two cam drums 19 mounted on shafts 18, one of the cam drums being provided in the front, and the other drum in the back, of the machine. Each of the cam drums carries a feeding cam 20 and a clamping cam 21, which cams impart certain independent movements to the slides 16 and 17.

If my automatic machine is to be used as a normal four spindle machine, with the work being machined in four subsequent spindle positions, the only change necessary is to remove the slides 16 and 17 on one side, with or without simultaneous removal or inactivation of the corresponding cam shaft 18 and cam drum 19.

Appropriate changes in the slides 16 and 17 make it also possible for the work to be fed in each of the four spindle positions whenever an actuation by the cam drums 19 takes place.

It is to be noted that it is not necessary to work identical pieces of work in the first and second phase of the working cycle. Where the same starting work is used, the finished products may differ widely.

It is believed that my invention, as well as the many advantages thereof, will be fully understood from the foregoing description. Some of the principles, features and advantages of the invention will be reviewed hereinafter.

My automatic multiple spindle machine is provided with at least two separate cam drums as well as the corresponding feeding and clamping slides, whereby each cam drum is provided with a feeding and a clamping cam, and the slides actuate the feeding and clamping chucks in various spindle positions.

In the first spindle position, the work is fed only a portion of its length and this part length is machined in the first and second spindle positions. In the third spindle position, the same work is fed further and this part length is then machined and finished in the remaining spindle positions, whereupon the work is thrown off. It will be understood that the part lengths that are worked in the first and second working cycles may be identical or different.

With an automatic multiple spindle machine according to my invention, where simple shapes are required, an output twice as large as that of a conventional automatic machine can readily be achieved. If a piece of work can be completed within one half of the spindle positions, for example, during the time that the spindle is positioned at two of the four illustrated positions, two finished pieces can be thrown off with each turn of the spindle cylinder 14. With such a twin arrangement, it may become advantageous to use the machine for simple pieces of work which normally would be handled on an automatic single spindle machine. If as described hereinbefore the double length of a bar of work is fed with each feeding, then with an automatic four spindle machine a piece of work is completed in each of the first and second spindle positions. After the next feeding step, two more finished pieces are thrown off in the third and fourth positions.

If the work is too long, with a bar being fed twice the work length, to permit a sufficiently solid clamping during the shaping of the first part length, it is nevertheless possible to obtain the same output by actuating the feed and spring chucks from each cam drum in more than one spindle position.

Altogether it may be stated that with the automatic multiple machine of my invention a substantially increased output can be achieved, particularly as far as the production of simple shapes is concerned. The output of the multiple spindle machine may amount to a multiple of the output of a single spindle machine, corresponding to the number of spindles of the multiple spindle machine. It is a special advantage of the automatic machine of my present invention that it permits the machining of pieces of work of twice the length of the normal feed advance. This, however, depends on the requisite condition that the machining of the individual lengths is so simple that the work can be completed in one half of the spindle positions. With very complex shapes where it is necessary to execute different operations on the same piece of work in each of the spindle positions, the second cam drum need not be used and may even be removed temporarily. It is, however, advisable to provide that the second cam drum may be added later on without difficulty.

It will be apparent that while I have shown and described my invention in certain forms, many changes and modifications may be made without departing from the spirit of the invention defined in the following claims.

I claim:

1. An automatic multiple spindle machine comprising a plurality of spindles, a rotatable support turret having said spindles mounted rotatably thereon and carrying said spindles through a plurality of successive working positions, each of said spindles including feeding and clamping chucks for respectively feeding and clamping a work piece in the related spindle, at least two separate cam drums, each of said drums having a feeding cam and a clamping cam formed thereon, and separate feeding and clamping slides driven by said feeding and clamping cams of each of said drums and respectively actuating the feeding and clamping chucks of the spindles located at different working positions.

2. An automatic multiple spindle machine according to claim 1; wherein four spindles are provided and arranged parallel to the axis of rotation of said support turret.

3. An automatic multiple spindle machine according to claim 2; wherein two separate cam drums are provided rotating about axes disposed in front of and in back of said axis of rotation of the support turret.

4. An automatic multiple spindle machine according to claim 1; wherein each of said feeding and clamping slides is formed to simultaneously actuate the feeding and clamping chucks, respectively, of spindles located at at least two of said working positions.

References Cited in the file of this patent

UNITED STATES PATENTS

| Number | Name | Date |
|--------|------|------|
| 999,435 | Crell | Aug. 1, 1911 |
| 2,087,109 | Lee | July 13, 1937 |